United States Patent [19]

Kawabata et al.

[11] Patent Number: 4,870,733

[45] Date of Patent: Oct. 3, 1989

[54] MANUFACTURING METHOD OF A PISTON FOR AN INTERNAL COMBUSTION ENGINE

[75] Inventors: Yasuhiro Kawabata, Anjo; Soichi Hara, Toyota, both of Japan

[73] Assignee: Aisin Seiki Kabushiki Kaisha, Kariya, Japan

[21] Appl. No.: 165,799

[22] Filed: Mar. 9, 1988

[30] Foreign Application Priority Data

Mar. 12, 1987 [JP] Japan ............................... 62-057276

[51] Int. Cl.[4] ............................................. B23P 15/10

[52] U.S. Cl. ................................ 29/156.5 R; 29/423; 29/527.3; 164/522; 264/277

[58] Field of Search ............... 20/156.5 R, 423, 527.1, 20/527.2, 527.3; 164/131, 522; 264/221, 275, 277, 317

[56] References Cited

U.S. PATENT DOCUMENTS

| | | | |
|---|---|---|---|
| 3,341,924 | 9/1967 | Clary et al. | 29/156.5 R |
| 3,413,897 | 12/1968 | Atkin | 29/156.5 R |
| 3,613,521 | 10/1971 | Itano | 29/156.5 R X |
| 4,228,727 | 10/1980 | Speaight et al. | 29/156.5 R X |
| 4,334,507 | 6/1982 | Köhnert et al. | 29/156.5 R X |
| 4,498,219 | 2/1985 | Ban et al. | 29/156.5 R |
| 4,532,686 | 8/1985 | Berchem | 29/156.5 R |
| 4,651,631 | 3/1987 | Auezou | 29/156.5 R X |

FOREIGN PATENT DOCUMENTS

| | | | |
|---|---|---|---|
| 1525895 | 2/1974 | Fed. Rep. of Germany | 29/156.5 R |
| 118350 | 6/1985 | Japan | 164/522 |
| 60-166158 | 8/1985 | Japan . | |

*Primary Examiner*—Timothy V. Eley
*Assistant Examiner*—Frances Chin
*Attorney, Agent, or Firm*—Oblon, Spivak, McClelland, Maier & Neustadt

[57] ABSTRACT

A manufacturing method of a piston in used for an internal combustion engine. The method comprises a step of reinforcing a circumference of a top ring groove by an inorganic fiber assembly, a step of forming an oil cooking gallery by a soluble core, a step of fixing the soluble core by projections formed in a strut preventing a thermal expansion of the piston, a step of setting the soluble core in a position supported by a punch mold, and step of setting the inorganic fiber assembly in an annular groove of a lower mold.

4 Claims, 2 Drawing Sheets

MANUFACTURING METHOD OF A PISTON FOR AN INTERNAL COMBUSTION ENGINE

BACKGROUND OF THE INVENTION

1. Field of the Invention

This invention relates to a manufacturing method of a piston for an internal combustion engine wherein a circumference of a top ring groove is complex-reinforced by an inorganic fiber assembly and wherein an oil cooling gallery is formed by a soluble core.

2. Description of Related Art

In a conventional method of a piston, for example in Japanese Patent Laid Open Publication No. 60-166158, a circumference of a top ring groove is reinforced by an inorganic fiber assembly or a porous metal, and an oil cooling gallery is formed near the top ring groove by using a soluble core.

The lower part of the soluble core has pinholes and the upper part of the punch mold has three poles. A pin is formed at the top of the pole and inserted in the pinhole of the soluble core.

In this condition, the soluble core is held in the punch mold and inserted in the casting mold. By the casting, the soluble core melts, and therefore the oil-cooling gallery is formed. The inorganic fiber assembly is, however, fragile and is sometimes broken in the casting, and X-ray inspection is necessary. The porous metal is expensive.

SUMMARY OF THE INVENTION

An object if the present invention is to prevent the breakage of the inorganic fiber. The further object of the present invention is to more cheaply manufacture the piston.

BRIEF DESCRIPTION OF THE DRAWINGS

Various other features, objects and attendant advantages of the present invention will become self evident when considered in connection with the accompanying drawings wherein.

DETAILED DESCRIPTION OF THE PREFERRED EMBODIMENT

Figure 1:
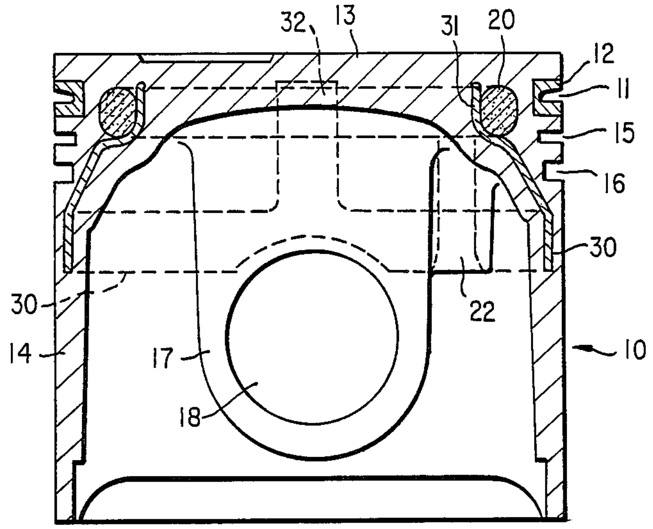
FIG. 1 is a cross sectional view which shows a preferred embodiment of a piston according to the present invention.

Referring to FIG. 1, a piston 10 is formed by high-pressured casting.

A groove 11 is complex-reinforced by an inorganic fiber assembly 12, and an oil-cooking gallery 20 is formed in the piston near an inside end of the groove 11.

The piston 10 has a top 13, skirt 14, a second groove 15 and an oil ring groove 16 in the outer side of the top 13, and has a pin boss 17 and a pin hole 18 in the inner side of the top 13 and the skirt 14.

Figure 2:
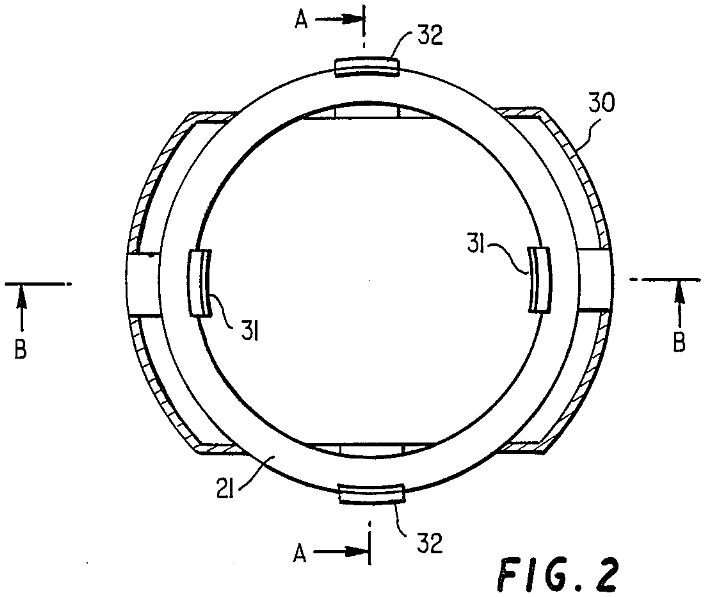
FIG. 2 is a completed view of a strut and a soluble core according to the present invention.
Figure 3:
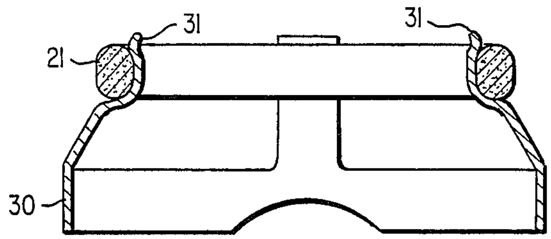
FIG. 3 is a cross sectional view which is taken along B—B in FIG. 2.
Figure 4:
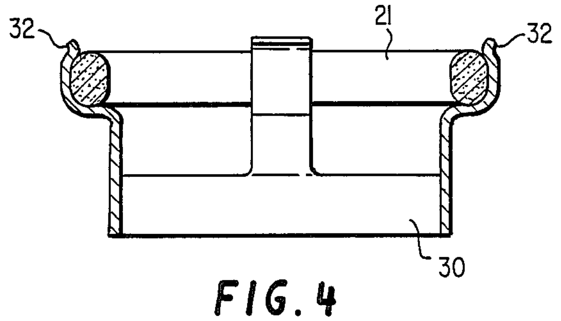
FIG. 4 is a cross sectional view which is taken along A—A in FIG. 2.

Referring to FIGS. 2, 3 and 4, a strut 30, which prevents the thermal expansion of the piston 10, has a plurality of projections 31, 32. A soluble core 21 is fixed by snap fitting to the projections 31, 32.

The projections 31, 32 are formed in a curved shape and along a face of the soluble core 21.

Figure 5:
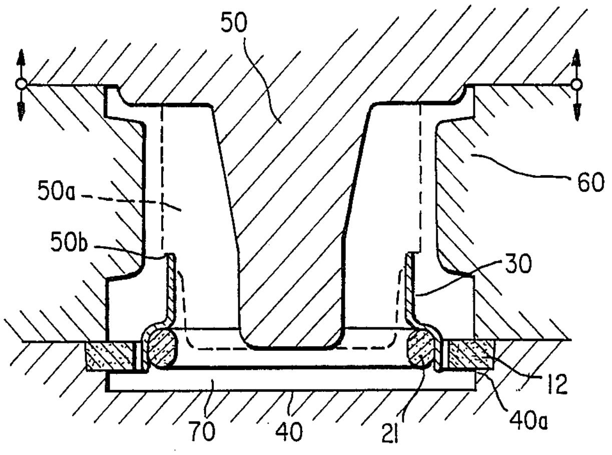
FIG. 5 is a cross sectional view which shows an assembled condition in a casting mold according to the present invention.

The soluble core 21 is fixed to the strut 30, and the inorganic fiber assembly 12 is set in an annular groove 40a of a lower mold 40. The soluble core 21 is positioned in a condition of a non-contact with the inorganic fiber assembly 12 by means of setting the strut 30 in a position supported by portion 50b of a punch mold 50a supported by upper mold 56 (shown by a dotted line in FIG. 5).

By means of pouring hot molten metal into the cavity 70 of casting mold 60 under this condition, the inorganic fiber assembly 12 is cast without being broken during the pouring, whereby an inner circumference of the top ring groove is reinforced and whereby both the soluble core 21 forming the oil gallery 20 and the strut 30 fixing the soluble core 21 are cast.

Furthermore, an oil inlet port 22 and an oil outlet port (not shown) are formed in the piston 10 so that both of the ports may face the soluble core 21. By means of pouring water to the oil inlet port 22, the soluble core 21 will melt whereby the oil gallery 20 will be formed. The top ring groove 11, the second groove 15, and the oil ring groove 16 are then formed at an outer circumference of the piston 10 by a cutting process.

What is claimed is:

1. Manufacturing method of a piston for an internal combustion engine, comprising the steps of:
- fixing a soluble core on a plurality of projections of strut means, said strut means to be incorporated into the piston for preventing thermal expansion of the piston;
- mounting said strut on a punch mold member in a casting mold;
- setting a fiber assembly in an annular groove of a lower mold member in the casting mold;
- casting a piston having said fiber assembly and said soluble core therein in said casting mold; and
- dissolving said soluble core to form an oil cooling gallery in said piston.

2. Manufacturing method of a piston for an internal combustion engine, comprising the steps of:
- fixing a soluble core on a plurality of projections of strut means, said strut means to be incorporated into the piston for preventing thermal expansion of the piston;
- mounting said strut on a punch mold member in a casting mold;
- setting an inorganic fiber assembly in an annular groove of a lower mold member in the casting mold;
- casting a piston having said inorganic fiber assembly and said soluble core therein in said casting mold; and
- dissolving said soluble core to form an oil cooling gallery in said piston.

3. Manufacturing method of a piston for an internal combustion engine as set forth in claim 2, wherein said a plurality of projections are formed in a curved shape and extend along a face of said soluble core.

4. Manufacturing method of a piston for an internal combustion engine as set forth in claim 2 including the step of forming a top ring groove in said piston at said inorganic fiber assembly.

* * * * *